(12) United States Patent
Kuck et al.

(10) Patent No.: US 10,733,829 B2
(45) Date of Patent: Aug. 4, 2020

(54) METHOD FOR DELIVERING ITEMS (71) Applicant: Ford Global Technologies, LLC, Dearborn, MI (US)

(72) Inventors: Detlef Kuck, Inden NRW (DE); James Neugebauer, Chelmsford Essex (GB); Torsten Gerhardt, London (GB); Mark Gijbels, Binkom Vlaams-brabant (BE); Tobias Ricke, Cologne NRW (DE); Alexandra Holz, Aachen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 15/976,577

(22) Filed: May 10, 2018

(65) Prior Publication Data

US 2018/0330561 A1  Nov. 15, 2018

(30) Foreign Application Priority Data

May 12, 2017  (DE) .................. 10 2017 208 050

(51) Int. Cl.
*G07F 17/12* (2006.01)
*G07F 17/10* (2006.01)
(Continued)

(52) U.S. Cl.
CPC ........... *G07F 17/12* (2013.01); *G06Q 10/083* (2013.01); *G06Q 10/0832* (2013.01);
(Continued)

(58) Field of Classification Search
CPC ................................ G07F 17/12; G07F 17/10
See application file for complete search history.

(56) References Cited

U.S. PATENT DOCUMENTS 6,344,796 B1 * 2/2002 Ogilvie .................. G07F 17/12
340/568.1
9,256,852 B1   2/2016 Myllymaki
(Continued)

FOREIGN PATENT DOCUMENTS

DE      69002643 T2    4/1994
DE   102013104755 A1  11/2014
JP      H02286520 A   11/1990

OTHER PUBLICATIONS

German Search Report for German Application No. DE 102017208050.7, Completed by the German Patent Office, dated Feb. 3, 2020, 6 pages.

(Continued)

*Primary Examiner* — Thomas Randazzo
(74) *Attorney, Agent, or Firm* — Gregory P. Brown; Brooks Kushman P.C.

(57) ABSTRACT

A system for delivering and/or picking up items comprising a container, which is closable via an openable/closable door and has access protection, and a standardized coupling mechanism for the option of fastening on a delivery vehicle, a mobile mini-vehicle or a stationary upright, wherein the coupling mechanism comprises a receiving means on the holder and comprises an engagement means, which is for engagement in the receiving means and is arranged on the delivery vehicle, on the mobile mini-vehicle and on the stationary upright such that the container is securable in a releasable manner optionally on the delivery vehicle, on the mobile mini-vehicle or on the stationary upright, and a corresponding method.

11 Claims, 6 Drawing Sheets

(51) Int. Cl.
  *G07C 9/00* (2020.01)
  *G06Q 10/08* (2012.01)
  *G06Q 50/30* (2012.01)
  *G07C 9/30* (2020.01)

(52) U.S. Cl.
  CPC ......... *G06Q 50/30* (2013.01); *G07C 9/00571* (2013.01); *G07C 9/00896* (2013.01); *G07C 9/30* (2020.01); *G07F 17/10* (2013.01); *G07C 2009/0092* (2013.01)

(56) References Cited

U.S. PATENT DOCUMENTS

| | | | | |
|---|---|---|---|---|
| 10,062,048 | B2* | 8/2018 | High | G07C 9/00571 |
| 10,227,178 | B2* | 3/2019 | High | B60P 1/6481 |
| 10,245,993 | B1* | 4/2019 | Brady | B60P 1/6418 |
| 10,310,500 | B1* | 6/2019 | Brady | G07C 9/00182 |
| 2007/0089467 | A1* | 4/2007 | Ace-Kirker | G07C 9/33 70/63 |
| 2007/0246495 | A1* | 10/2007 | Hague | B60R 5/04 224/281 |
| 2018/0024554 | A1* | 1/2018 | Brady | G06T 7/20 701/23 |
| 2018/0047236 | A1 | 2/2018 | Heinz et al. | |
| 2018/0070753 | A1* | 3/2018 | Eveloff | G07C 9/00 |
| 2018/0147969 | A1* | 5/2018 | Richardson | B60P 1/38 |
| 2018/0186454 | A1* | 7/2018 | Luckay | B64D 1/12 |
| 2018/0228311 | A1* | 8/2018 | Bloom | A47G 29/141 |

OTHER PUBLICATIONS

D'Onfro Jillian, Google has a clever idea to let its self-driving cars deliver your packages, Business Insider, Feb. 9, 2016 (2 pages).

* cited by examiner

METHOD FOR DELIVERING ITEMS

CROSS-REFERENCE TO RELATED APPLICATIONS

This application claims foreign priority benefits under 35 U.S.C. § 119(a)-(d) to DE Application 10 2017 208 050.7 filed May 12, 2017, which is hereby incorporated by reference in its entirety.

TECHNICAL FIELD

The invention relates to a method and related system for delivering and/or picking up items wherein a container having coupling means is anchorable to mating coupling means attached to one or more delivery vehicles and to an immobile object at a delivery location.

BACKGROUND

DE 690 02 643 T2 discloses depositing items collected for distribution in a district in a container in the district and distributing the individual items from said container. The container is able to be deposited and also picked up again in off-peak hours for this purpose. The container can be provided with a lock which interacts with a counter lock in order to secure said container against unauthorized movement. The distributor can then open the container by means of secured access.

U.S. Pat. No. 9,256,852 B1 discloses providing an autonomously driven vehicle with a plurality of secured compartments for receiving items to be delivered. The addressee is able to open the respective compartment by means of codes, etc. in order to remove his item. The code etc. is able to be transmitted by mobile phone etc.

However, there is still a need for a facility to deliver items in a city center during off-peak hours, by way of which facility no returns of un-deliverable items are required even when the addressee is not present, and at the same time the delivery is able to be affected, where required, after transloading from a larger delivery vehicle to a smaller delivery vehicle without special solutions and repacking being necessary in each case.

SUMMARY

In accordance with features of the invention, a modular system is proposed to deliver and/or pick up items. The system includes a container, which is closable via an openable/closable door and has access protection, and a standardized coupling mechanism for optionally fastening the container to a large vehicle (such as a distribution truck or van), a smaller vehicle (such as a moped, bicycle, or micro-van) and, to an immovable object (such as a lamp-post) at a delivery location. The coupling mechanism comprises a receiving means on the container or on an anchoring unit, and a mating engagement means on the other of the container or the anchoring unit, such that the container is securable in a releasable manner optionally/sequentially on the distribution vehicle, the delivery vehicle, and on the immobile object.

In other words, the container receives therein the item (or items) to be delivered and is secured on a distribution vehicle and/or delivery vehicle (truck, mini-vehicle, electric scooter, micro-van, etc.) or on an immobile object (e.g. streetlamp post, bus stop post, etc.) by means of the modular coupling which is made up by the first and second coupling features or devices that are releasably lockable with one another.

Consequently, the item (within its container) can be transported first by a first vehicle (generally, relatively large and able to carry multiple containers, such as a distribution truck or van) to a desired transloading location, such as a city boundary. There, the containers can be manually or automatically transloaded onto one or more smaller delivery vehicles (such as a micro-van, electric scooter, bicycle, etc.) for transport over the so-called "last mile" to the designated recipient (addressee) of the container/item. There, the container may be either opened by the delivery person and the item handed over to the recipient, or, if the addressee/recipient is not present at the time, the delivery person is able to secure the container to a correspondingly equipped immobile object (e.g. streetlamp post, bus stop post, etc.) using the mating coupling devices provided thereon. The container may be opened later by the addressee and the item(s) removed.

The invention therefore allows the secure (theft-proof) delivery of items in an urban area on the one hand at low peak times and no returns of un-delivered items are required if the recipient is not present and at the same time the delivery is able to be made, where required, using mobile mini-vehicles without special solutions and repacking being necessary.

As a result of providing the modular/universal fastening arrangement or coupling means, it is possible to attach the container to any vehicle that may be desired to use for distribution and or delivery of the container.

To this end, it is useful when the container comprises standardized coupling features, shown in the disclosed embodiment as bores, which are arranged in a prescribed pattern, as the receiving means. In addition, the engagement means should comprise projections which are configured for releasable fixing engagement in the bores.

It is useful for the releasing/securing when, at a corresponding locking signal or unlocking signal, at least one of the coupling features or devices (the bores and/or the mating projections in the disclosed embodiment) alter their form or position on the container, on the delivery vehicle, or on the immobile object for securing or releasing the connection between the container and the anchoring unit. Consequently, the securing and releasing can be affected in a targeted and secured manner so that unauthorized access is prevented.

In the case of a change in form, it is possible to use a shape-memory alloy which (as is known in the art) changes shape or form when power is applied, such that power is necessary only at the time of the change (locking or unlocking). As an alternative to this, when there is a change in position, corresponding latching bolts etc. can be latched in a known manner into/out of undercuts to retract or extend the projections (bolts, locking bars, mandrels etc.).

The projections can also be realized as a locking rod which engages in a bore which passes through the container and at the same time extends through eyelets on the delivery vehicle or on the immobile object.

The movement of the projections for release from the bores can be affected in a manual or power-driven manner.

The corresponding locking signal or unlocking signal for triggering the unlocking movement or locking movement can be affected by means of an electronic module or controller which is preferably arranged on the container (integral therewith or attachable thereto) and is protected against unauthorized actuation by way of a security means requiring entry of an identifier such as a PIN, code, or biometric identification such as a fingerprint.

The operator (as required, the sender, shipper, delivery person, designated recipient, etc.) is thus able to trigger the corresponding signal by entering the identifier (such as a code, alphanumeric, or fingerprint) via an input device such as a keyboard, a mobile device (smartphone etc.), a fingerprint reader etc.

The same also applies to the opening/securing of the openable/closable door of the container. The container can therefore comprise a secured openable/closable door which is protected against unauthorized actuation by means of a security means and is not openable until released by means of a control means which is preferably arranged on the container.

So that the container may be deposited at a delivery location in the absence of the designated recipient, the container can be aligned and arranged by means of the mating coupling devices, which are arranged on the immobile object (such as a streetlamp, etc.) in such a manner with the openable/closable door oriented toward and adjacent to a fixed obstruction (such as the ground) such that the door is not openable so long as the container is locked/anchored to the object. In other words, the container is aligned and oriented close to the ground with the side which bears the door facing downward such that there is insufficient space between the door and the ground to permit opening of the door. The door is clamped between the container and the ground (or wall etc.) and cannot be opened until the container is released from the immobile object and moved away from the ground.

The container may further comprise a second set of clamping devices on the oppositely located side, the containers can be coupled together in series.

The invention also relates to a corresponding method for delivering and/or picking up items which are conveyed in a container which is closable by means of an openable/closable door and has access protection, wherein the container is provided with a standardized coupling mechanism for the option of fastening to a distribution vehicle, a delivery vehicle, a mini-vehicle or a stationary upright, wherein the coupling mechanism comprises a receiving means arranged on the container and a mating engagement means arranged on the distribution/delivery vehicle and on the immobile object, for engagement in the receiving means such that the container is securable in a releasable manner optionally/sequentially on the distribution vehicle, delivery vehicle, and immobile object.

Therefore, as a result of the container and of the standardized/modular fastening thereof by means of the coupling mechanism, the method according to the invention allows the option of a distribution vehicle, delivery vehicle, immobile object (as realized above) to be utilized for delivering and picking up items. In this case, simply the container is moved in each case. The item remains protected and secured inside such that in spite of a change in the "movement type", it arrives at and is retrievable only by the designated recipient that is in possession of the proper identified.

Further details concerning the method are produced from the explanations above concerning the system.

Further details of the invention are produced from the following description of the drawing, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
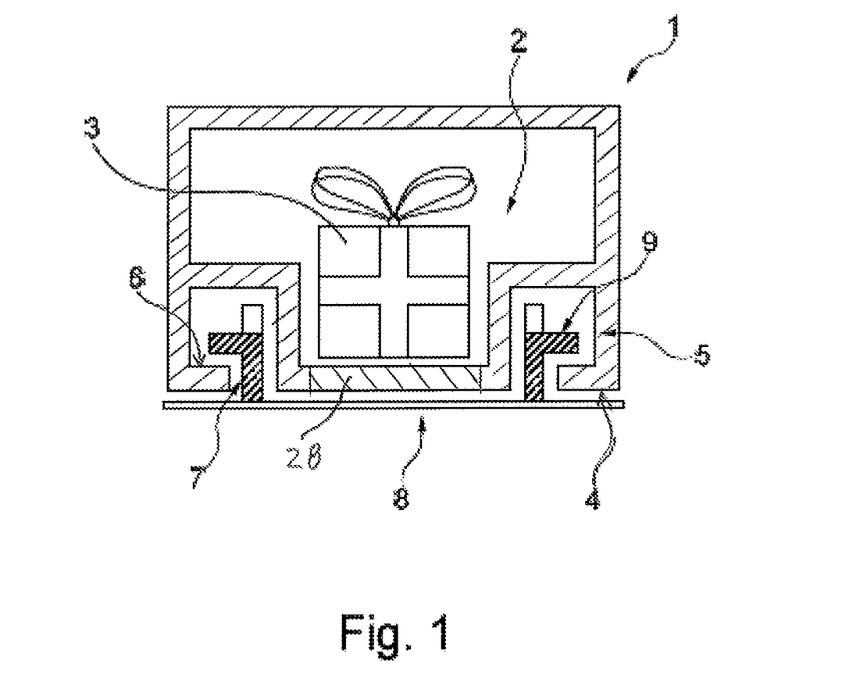
FIG. 1 shows, in schematic form, a section through a container and a coupling mechanism.

FIG. 1 shows a schematic cross-sectional view of a container which is designated as a whole by reference numeral 1.

An item 3 (such as a package) for delivery is situated in an interior 2 of the container 1. A flap or door 28 is arranged on a surface of the container 1 (the bottom surface 4, as depicted here) and is movable between open and closed positions in order to enable secured access to the interior.

On its bottom surface 4, the container 1 has one or more couplings which in the illustrated embodiment comprise bores 5 which are arranged in a prescribed pattern and form an interior ledge or undercut 6.

An anchoring unit 8 has mounted to it one or more mating couplings that are configured for mating engagement with those of the container 1. As described further below, the anchoring unit 8 may comprise part of or be attached to a distribution vehicle, delivery vehicle, and/or an immobile object. In the illustrated embodiment, the mating couplings comprise latching mandrels 7 arranged on the anchoring unit 8 in a pattern that corresponds (locations/spacing in the longitudinal and transverse direction) with the pattern of the bores 5 of container 1, and therefore will project into the bores when the container 1 is correctly placed onto the anchoring unit 8.

To lock the latching mandrels 7 in the bores 5, said latching mandrels are actuated to expand, deform, bend, or otherwise change configuration in a manner so that they engage the undercuts 6. In the illustrated embodiment, latching mandrels 7 comprise a tip 9 formed of a shape-memory alloy such that after the mandrels have been received by the respective bores 5 they may be acted upon with power to cause the tips 9 to "bend over" and engage the respective undercuts 6, and thus secure the container on the anchoring unit 8.

Figure 2:
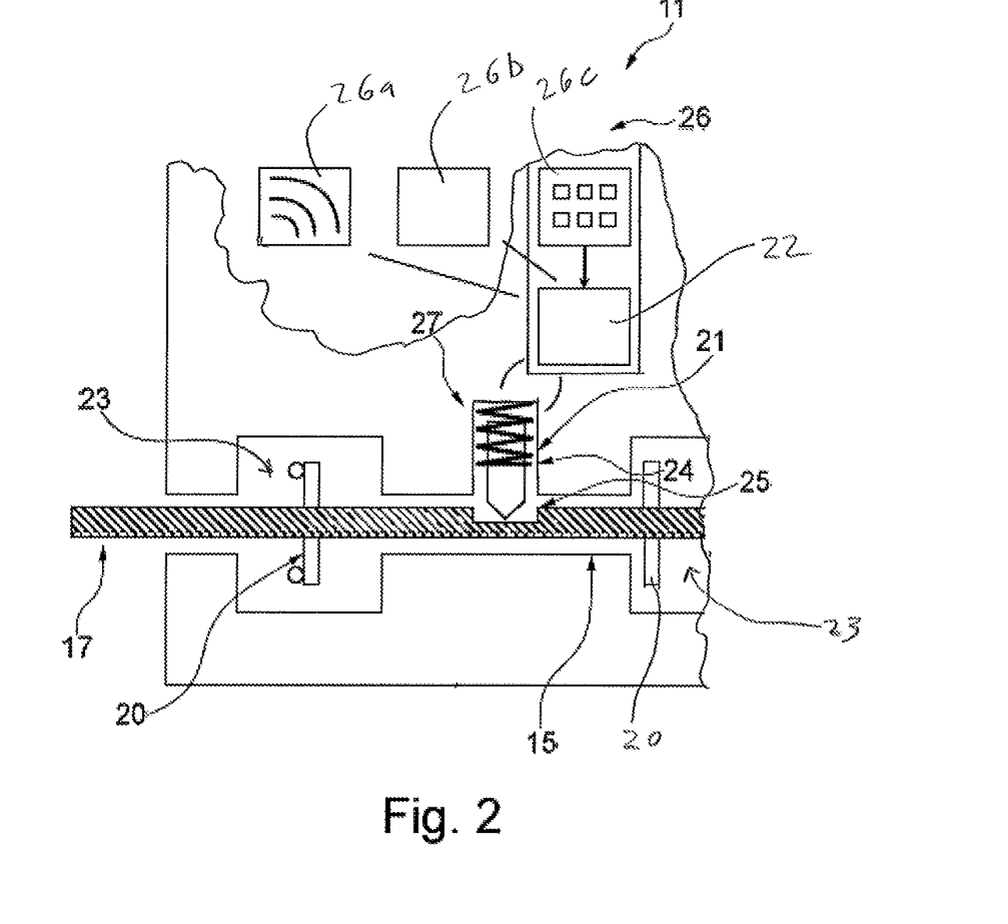
FIG. 2 shows a schematic section through a further container and a further coupling mechanism.

FIG. 2 shows an alternative embodiment of a container 11.

This differs substantially only by the coupling mechanism used. Consequently, corresponding parts are designated by references that are increased by 10.

In the illustrated embodiment, the coupling of the container 11 comprises a bore 15 passing through the container 11 and recesses 23 located along and communicating with the bore. The recesses 23 communicate with a bottom surface of the container 11 (similar to the bores 5 described in relation to the embodiment of FIG. 1). The mating coupling in this case comprises one or more eyelets 20, the number, configuration, and placement of which correspond to the recesses 23. To this end, the eyelets 20 protrude in the direction of the container 11 and enter the recesses 23 when the container is place onto a surface (such as the anchor unit in FIG. 1) from which the eyelets project.

An elongated locking rod 17 is then inserted into the bore 15 to pass through the eyelets 20. A spring bolt 21 is pressed by a spring 24 into a correspondingly positioned and dimensioned groove 25 in the rod 17, thereby locking the container 11 to the eyelets.

The container 11 further comprises an electronic module or controller 22 which generates alternative locking and unlocking signals which actuates the spring bolt 21 by means of an electro-mechanical actuator 27 (such as a solenoid). In response to a locking signal, the spring bolt 21 is extended downward (as shown in FIG. 2) and locking rod is locked against axial movement. Alternatively, in response to an unlocking signal the spring bolt is drawn upward by the actuator 27 so that the locking rod is free to be withdrawn from the bore 15. By its generation of locking and unlocking signals, the controller 22 thereby determines whether or not the locking rod 17 may be withdrawn from engagement with the container 11 and the eyelets 20.

To cause the controller 22 to generate an unlocking signal and thereby release the container 11 from the eyelets 20, an operator enters an identifier by means of an input device 26 (which may be, for example, a mobile device 26*a* (i.e., smartphone or Bluetooth™ device), a fingerprint reader 26*b*, or a key pad 26*c*). The controller 22 receives this input and if it matches a pre-programmed unlock identifier, generates the unlocking signal by which the electro-mechanical actuator 27 is activated to pull back the spring bolt 21 and disengage from the groove 25, such that the rod 17 is free to be withdrawn from the bore 15. The container 11 may then be released from the eyelet(s) 20.

The input device 26 may be an integral part of the container 11, may be mounted to the container 11, and/or may be a separate unit (such as a mobile device/smartphone) that communicates with the controller 22 using a wireless communication (such as Bluetooth™)

Figure 3:
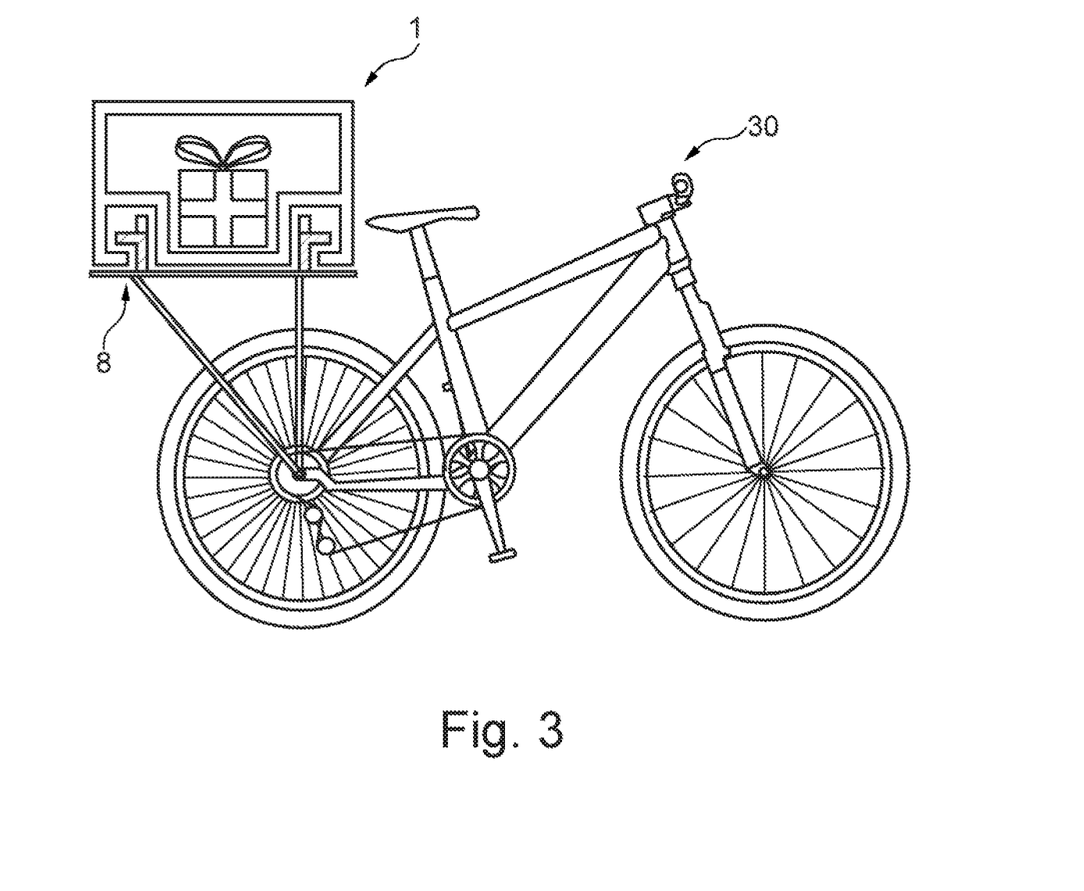
FIG. 3 shows a schematic view of the container from FIG. 1 on an electric scooter.

With reference to FIG. 3, it can be seen that the corresponding container 1 is securable via the mating couplings onto a delivery vehicle 30. The anchoring unit 8 may comprise a portion of the vehicle 30 and/or may be mounted thereto. The delivery vehicle 30 may, as illustrated, be a mini-vehicle of a type that is highly mobile and therefore well suited for delivering and picking up items in a crowded urban environment, such as an electric scooter or bicycle.

It is also conceivable for multiple containers 1 to be fixed on a corresponding anchoring unit 8 which is provided with multiple sets of mating couplings.

Figure 4:
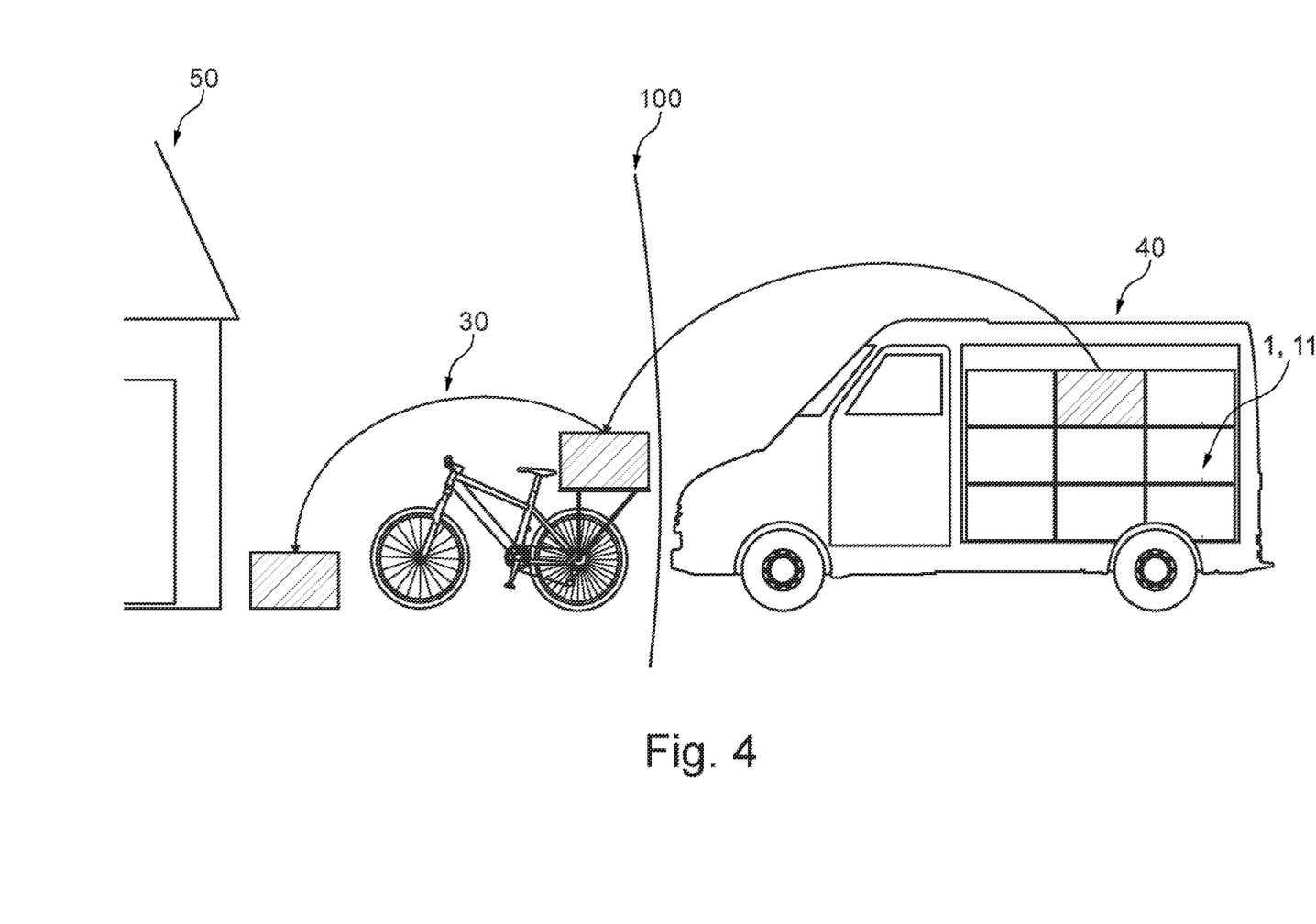
FIG. 4 shows a schematic view of a supply chain using the container.

FIG. 4 illustrates a supply chain in which a plurality of containers 1, 11 are first transported by a relatively large distribution vehicle, such as a truck or van 40, to a transload location 100 (such as a city boundary) where transloading of the containers to a different means of transportation is desired.

At the transload location 100, the containers 1, 11 are transferred onto one or more other relatively smaller delivery vehicles (mini-vehicles 30 for example) which are better suited for covering the so-called last mile to the designated recipient/addressee 50 and making the delivery.

There, the container(s) 1, 11 may be opened by the delivery person or by the recipient 50 (dependent upon being in possession of the unlocking identifier required to release the container from the vehicle 30) and the item(s) inside the container may be delivered as usual.

If the delivery person does not find the recipient 50, he/she can secure the container 1, 11 to an anchoring unit which here comprises an immobile object such as a post 61 that is fitted/equipped with appropriate coupling devices so that the container can be picked up/opened by the recipient at a later time.

Figure 5:
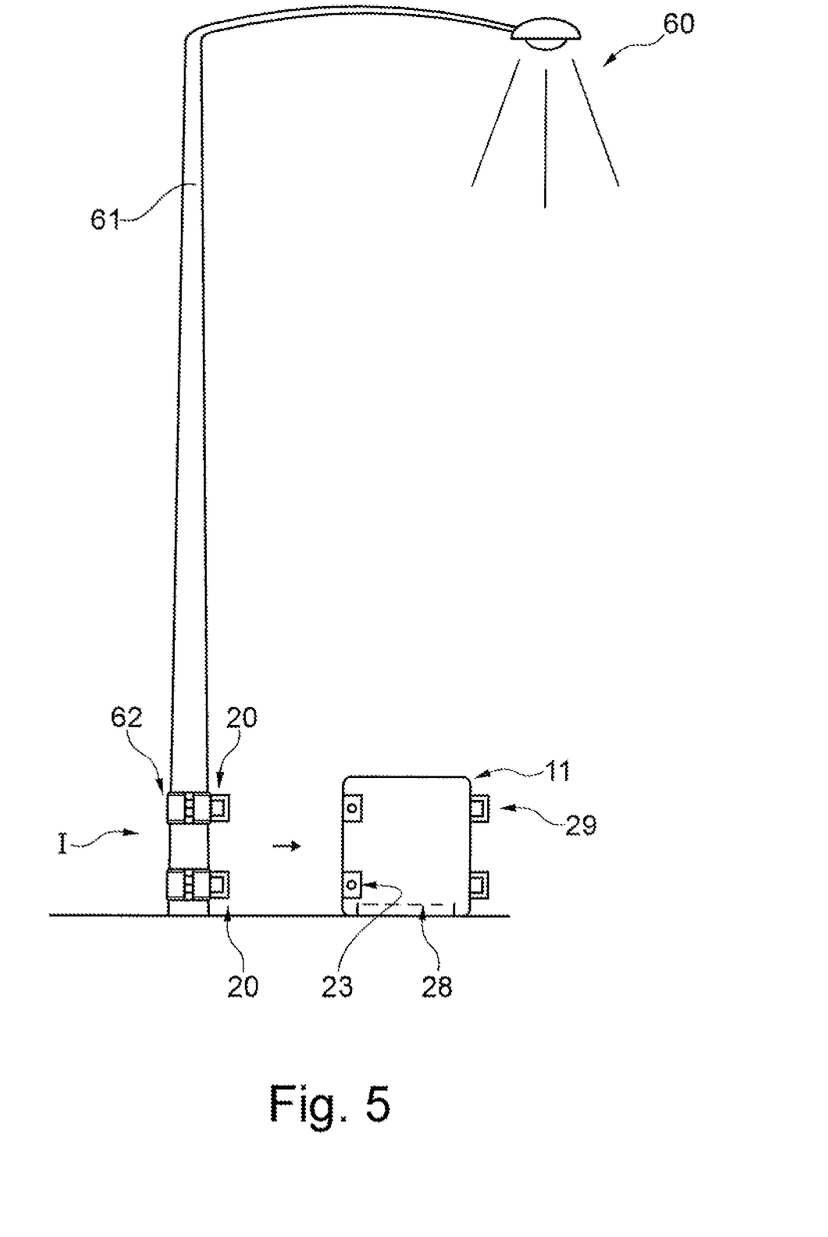
FIG. 5 shows a schematic view of the interaction between a container, the coupling mechanism and a street lamp with engagement means.

In the FIG. 5 example, the container corresponds to the variant 11 with protruding eyelets 20 which, in the present case are fastened on an anchoring unit in the form of an immobile object such as a post 61 (which may support, for example, a streetlamp 60).

To this end, the eyelets 20 may be fastened on the post 61 by means of metal bands 62 using screw connections that are accessible only with the container 11 removed from engagement with the eyelets 20/post 61. Therefore, the eyelets 20 cannot be detached from the post 61 as long as the container 11 is fixed thereto, and are consequently secured against unauthorized removal of the container from the post 61.

In this case, the eyelets 20 are arranged in such a manner in the lower region 1 of the post 61 that, during fixing, the bottom surface of the container 11 having the openable/closable door 28 is arranged so close (a distance of a few mm) to the ground (or other fixed obstruction) that the ground (or other fixed obstruction) physically blocks the door 28 from being opened. Thus, it is not possible to open the door 28 until the container 11 has been unlocked and removed from the post 61 by means of the control means 22.

In a further feature of the disclosed concept, the container 11 of FIG. 5 comprises an additional set of eyelets 29, which project from a side of the container opposite from the recesses 23. This permits an additional container 11 to be fastened there, and so-called "daisy-chaining" of multiple containers is thus possible.

Figure 6:
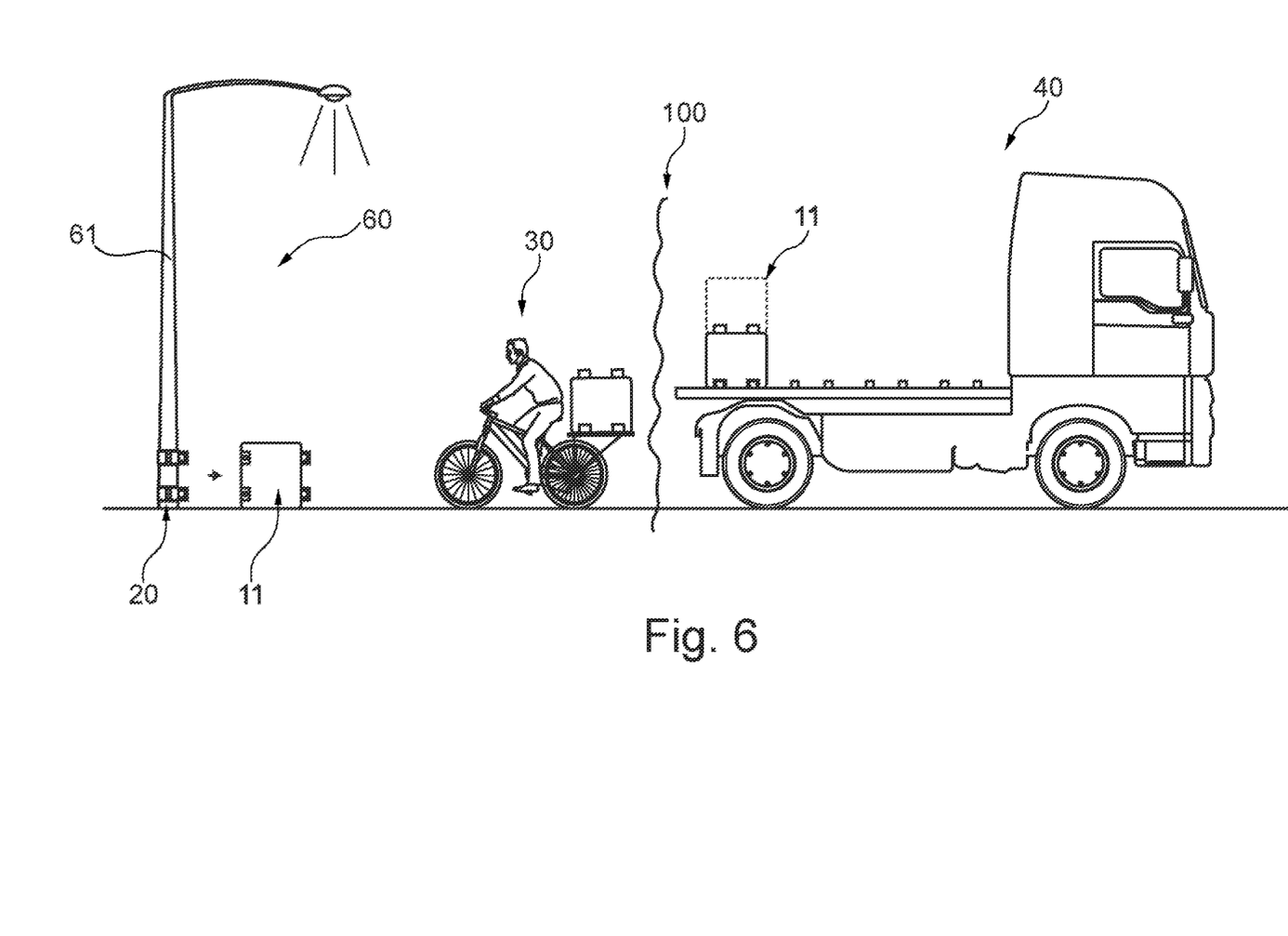
FIG. 6 shows a schematic view of a supply chain using the container and the interaction from FIG. 5.

In the supply chain shown in FIG. 6, container(s) is/are first transported to the transloading region 100 in the distribution vehicle 40. There, the appropriate container(s) 11 is/are transloaded onto smaller delivery vehicles 30 for transportation over the so-called "last mile" to the designated recipient.

There, the container 11 is secured by means of the mating coupling devices to correspondingly fitted-out posts 61, as can be seen in FIG. 5, so that they may be unlocked from the post and opened later by a recipient that has been provided (by the sender and/or shipper) with the correct unlocking identifier.

It is thus possible to "deliver" the item in spite of the absence of the recipient, who may be informed of the delivery location 61 by a message.

In addition, it is also possible in this way for the recipient to become the sender by placing items in provided (empty) containers 11 so that they can be picked up.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   transporting a container to a transload location aboard a first vehicle;
   transloading the container from the first vehicle to a second vehicle and locking a coupling integral with the container onto a mating coupling on the second vehicle;
   transporting the container to a delivery location aboard the second vehicle;
   unlocking the coupling from the mating coupling and unloading the container from the second vehicle; and
   locking the coupling onto a second mating coupling on an immobile object at the delivery location to reversibly secure the container to the immobile object, the coupling subsequently unlockable from the second mating coupling in response to an unlocking signal generated by a controller associated with the container, wherein locking the coupling onto the second mating coupling comprises inserting eyelets extending from the immobile object into respective bores formed in the container and passing a rod through the container and through the eyelets.

2. The method of claim 1 further comprising:
   providing to a designated recipient of the container an identifier for input into an input device connected with the controller, thereby causing the controller to generate the unlocking signal.

3. The method of claim 1 wherein the step of locking the coupling onto the second mating coupling further comprises:
   positioning the container with a door providing access to an interior of the container adjacent an obstruction which blocks opening of the door.

4. A method comprising:
   transporting a container aboard a vehicle to a location;
   locking a coupling integral with the container onto a mating coupling on an immobile object at the location to reversibly secure the container thereto, wherein locking the coupling onto the mating coupling comprises inserting eyelets extending from the immobile object into respective bores formed in the container and passing a rod through the container and through the eyelets; and
   providing an identifier to a designated recipient of the container for input into an input device connected with a controller, thereby causing the controller to generate a signal unlocking the coupling from the mating coupling.

5. The method of claim 4 further comprising, prior to the transporting step:
   transloading the container from a second vehicle onto the vehicle at a transloading location remote from the location; and
   locking the coupling onto a second mating coupling on the vehicle.

6. The method of claim 4 wherein the step of locking the coupling to the mating coupling further comprises:
   positioning the container with a door providing access to an interior of the container adjacent an obstruction which blocks opening of the door.

7. The method of claim 4 wherein a plurality of containers are transported by the vehicle and individual containers of the plurality are locked to respective separate mating couplings.

8. A method comprising:
   transporting a container aboard a vehicle to a location; and
   locking a coupling integral with the container onto a mating coupling at the location to reversibly secure the container thereto, wherein locking the coupling onto the mating coupling comprises inserting eyelets extending from an object at the location into respective bores formed in the container and passing a rod through the container and through the eyelets, the couplings and the mating coupling subsequently unlockable from one another after a container controller issues an unlocking signal in response to receipt of an identifier, disengagement of the respective couplings enabling removal of items from the container.

9. The method of claim 8 wherein the object is an immobile object.

10. The method of claim 8 wherein the object is a second vehicle.

11. The method of claim 10 further comprising:
    transporting the container to a second location aboard the second vehicle;
    unlocking the coupling from the mating coupling and unloading the container from the second vehicle; and
    locking the coupling onto a second mating coupling on an immobile object at the second location to reversibly secure the container to the immobile object, the coupling subsequently unlockable from the second mating coupling in response to a second unlocking signal generated by the container controller.

* * * * *